United States Patent [19]
Walker

[11] Patent Number: 5,944,050
[45] Date of Patent: *Aug. 31, 1999

[54] PRESSURE RELIEF OR BACK PRESSURE VALVE

[75] Inventor: David E. Walker, Dundas, Canada

[73] Assignee: 1219737 Ontario Inc., Burlington, Canada

[*] Notice: This patent is subject to a terminal disclaimer.

[21] Appl. No.: 09/028,500

[22] Filed: Feb. 24, 1998

Related U.S. Application Data

[63] Continuation of application No. 08/718,719, Sep. 24, 1996.

[51] Int. Cl.$^6$ .................................................. F16K 31/12
[52] U.S. Cl. ..................... 137/510; 137/115.27; 137/557; 251/331; 251/61.1
[58] Field of Search ............................... 137/510, 115.27, 137/557; 251/331, 61.1

[56] References Cited

U.S. PATENT DOCUMENTS

| | | | |
|---|---|---|---|
| 3,662,779 | 5/1972 | Weber et al. | 137/510 |
| 3,727,623 | 4/1973 | Robbins | 251/331 |
| 4,284,039 | 8/1981 | Belicardi et al. | 137/510 |
| 4,555,719 | 11/1985 | Arway et al. | 137/310 |
| 4,741,360 | 5/1988 | Affeldt et al. | 137/510 |
| 4,744,388 | 5/1988 | Ariizumi et al. | 251/61.1 |

FOREIGN PATENT DOCUMENTS

| | | | |
|---|---|---|---|
| 485370 | 8/1952 | Canada | 137/510 |
| 1186715 | 2/1965 | Germany | 251/61.1 |
| 2306390 | 8/1974 | Germany | 251/61.1 |

*Primary Examiner*—Denise L. Ferensic
*Assistant Examiner*—Joanne Y. Kim
*Attorney, Agent, or Firm*—Rogers & Scott

[57] ABSTRACT

A pressure relief or back pressure valve has a valve body with a tubular outlet member having an outlet surrounded by an end face and an annular inlet chamber surrounding the outlet member. The annular inlet chamber has an outer periphery defined by a wall member with an end face in a plane spaced away from a plane defined by the end face of the outlet member. A flexible diaphragm has an outer peripheral edge portion clamped between the end face of the wall member and a clamping member, the flexible diaphragm in an undeflected configuration having a central portion spaced from the end surface of the outlet member. A resilient force applying device is operable to apply a predetermined force to the diaphragm to cause the diaphragm to be deflected into engagement with the end face of the outlet member, and a release device is operable to remove the force from the diaphragm to permit the diaphragm to move away from the end face of the outlet member.

5 Claims, 3 Drawing Sheets

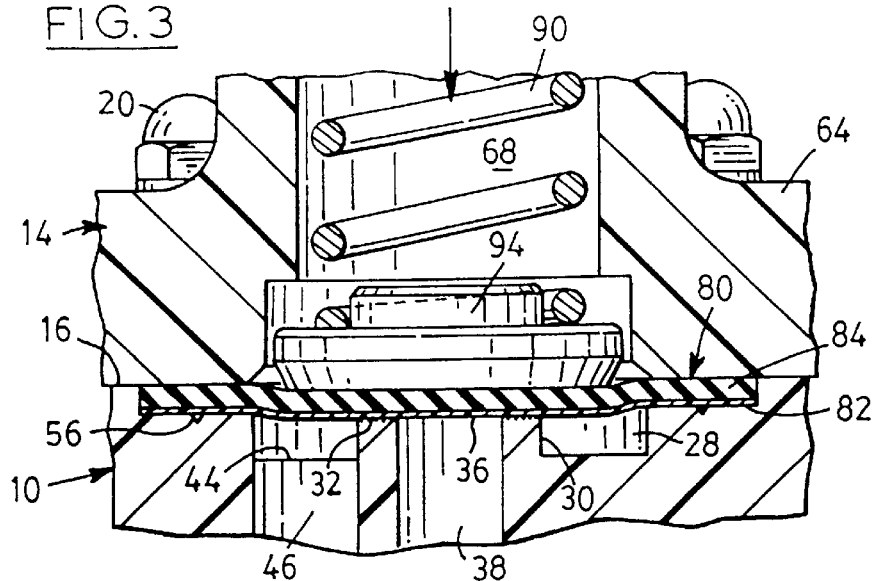
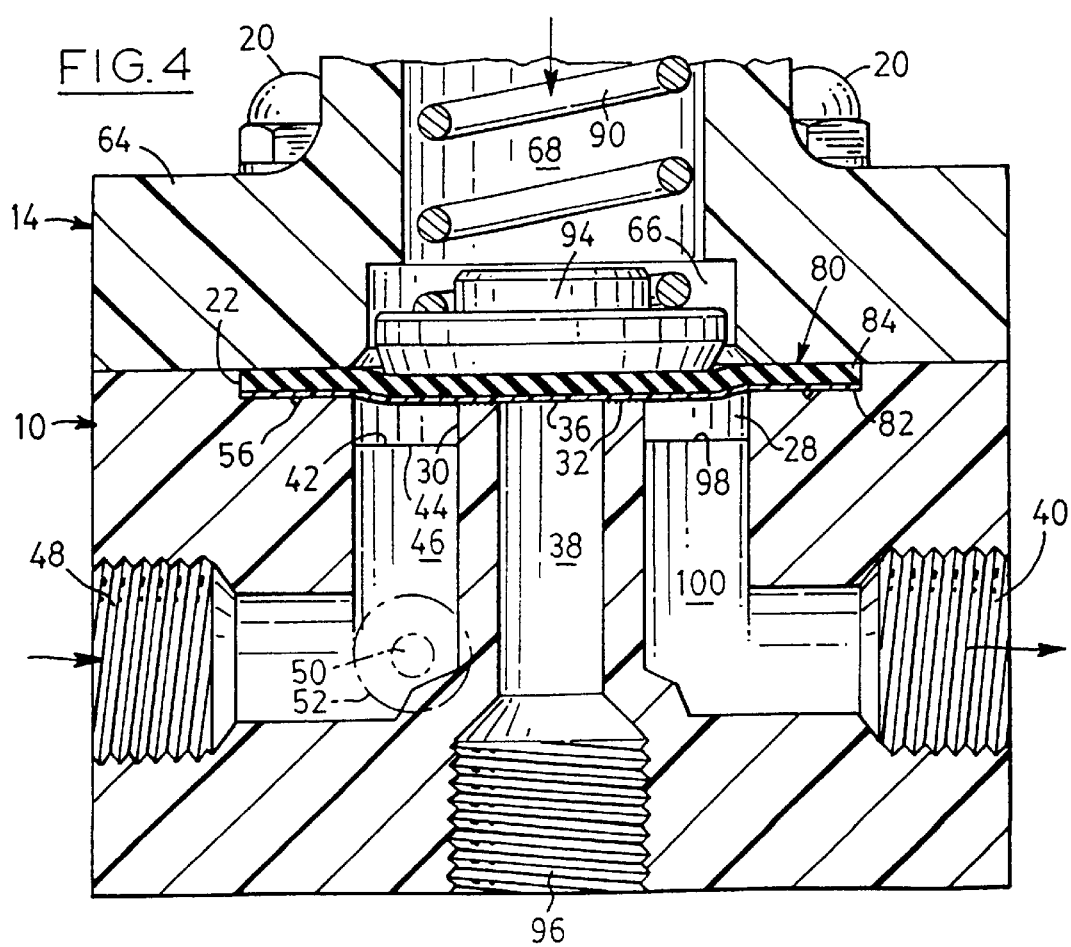

PRESSURE RELIEF OR BACK PRESSURE VALVE

This application is a continuation of application Ser. No. 08/718,719 filed Sep. 24, 1996.

BACKGROUND OF INVENTION

This invention relates to pressure relief or back pressure valves. Pressure relief or back pressure valves in which a flexible diaphragm is resiliently urged against a valve seat are well known.

It is an object of the invention to provide a pressure relief or back pressure valve with an improved valve seat.

SUMMARY OF INVENTION

According to the invention, a pressure relief or back pressure valve includes a valve body having a tubular outlet member with an outlet surrounded by an end face, and an annular inlet chamber surrounding the outlet member. The end face of the tubular outlet member has a series of concentric annular ridges surrounding the outlet therein. The annular inlet chamber has an outer periphery defined by a wall member with an end face, and a flexible diaphragm has an outer peripheral edge portion clamped between the end face of the wall member and a clamping member. A resilient force applying device is operable to apply a predetermined force to the diaphragm to cause the diaphragm to engage the concentric annular ridges on the end face of the outlet member in a valve closing manner.

The diaphragm may have an end face engaging layer of sealing material and a backing layer of resilient material laminated thereto. The thickness of the sealing layer may be in the range of from about 0.005 to 0.02 inches, and the thickness of the backing layer may be in the range from about 0.0625 to about 0.25 inches.

When the valve is a back pressure valve, the annular inlet chamber may be in communication only with a valve inlet when the diaphragm is in engagement with the end face of the outlet member.

When the valve is a pressure relief valve, the annular inlet chamber may be in communication with a valve inlet and a valve outlet separate from the tubular outlet member when the diaphragm is in engagement with the end face of the outlet member.

BRIEF DESCRIPTION OF THE DRAWINGS

Embodiments of the invention will now be described, by way of example, with reference to the accompanying drawings, of which:

FIG. 3 is a similar view of part of FIG. 2 but showing the diaphragm in a closed position, and FIG. 4 is a longitudinal sectional view of the lower portion of a pressure relief valve in accordance with another embodiment of the invention.

DESCRIPTION OF PREFERRED EMBODIMENTS

Figure 1:
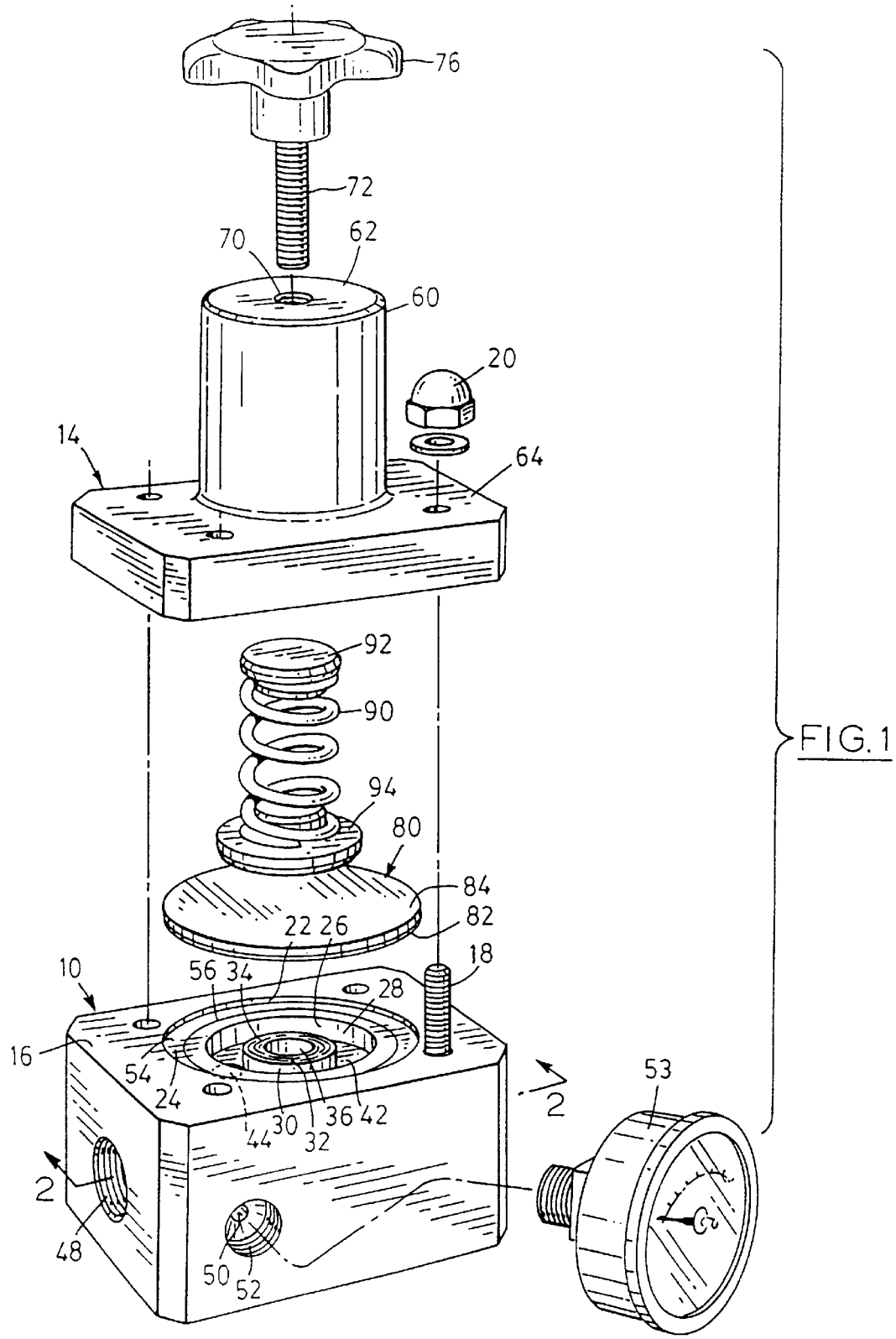
FIG. 1 is an exploded perspective view of a back pressure valve in accordance with one embodiment of the invention.
Figure 2:
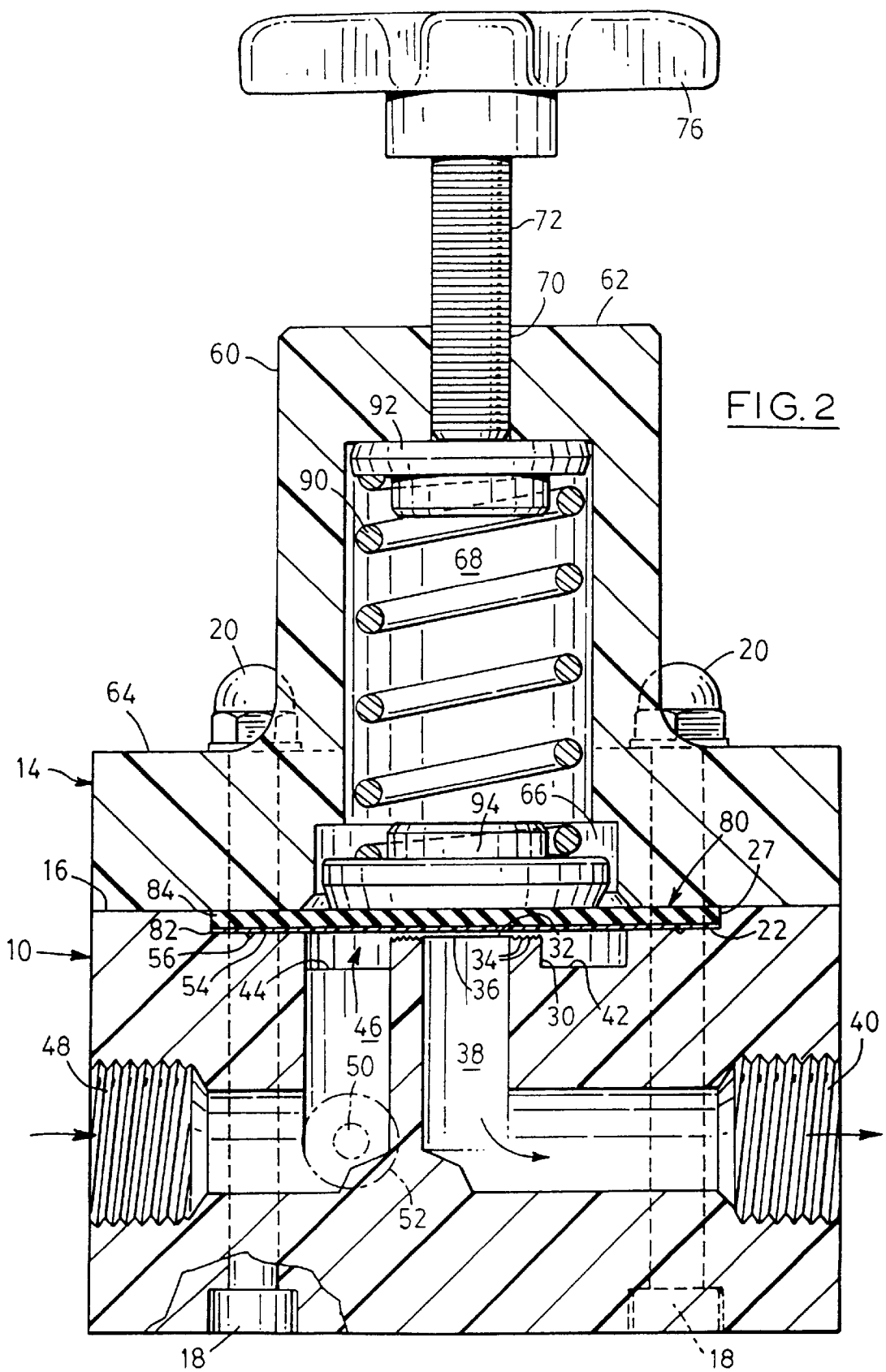
FIG. 2 is a longitudinal sectional view of the valve of FIG. 1 showing the diaphragm in the open position.

Referring to the drawings, FIGS. 1 to 3 show a back pressure valve with a valve body 10 of moulded plastic or metallic material and a clamping member 14 also of moulded plastic or metallic material clamped against an upper face 16 thereof by bolts 18 and nuts 20.

The upper face 16 of the valve body 10 has a circular recess 22, the radially outer portion 24 of which is of limited depth so as to provide a wall member 26 defining the radially outer periphery of an annular inlet chamber 28 which surrounds a tubular outlet member 30. The tubular outlet member 30 has an end face 32 with a series of concentric annular ridges 34 surrounding a central outlet aperture 36 therein. The central outlet aperture 36 communicates through a passage 38 in the valve body 10 with an outlet port 40. The annular bottom face 42 of the annular inlet chamber 28 has an inlet aperture 44 which communicates through a passage 46 in the valve body 10 with an inlet port 48 and through a further passage 50 in the valve body 10 communicates with a pressure gauge port 52 for receiving a pressure gauge 53. The bottom surface 54 of the radially outer portion 24 of the recess 22 has an annular groove 56 concentric with the tubular outer member 30 and located approximately midway between the radially inner and outer peripheries of the bottom surface 54.

The clamping member 14 has a tubular upper portion 60 with a closed top 62 and a flange 64 extending around its lower end. The flange 64 has a central aperture 66 communicating with an internal chamber 68 in the upper portion 60. The top 62 of the upper portion 60 has a central screw-threaded aperture 70. A screw-threaded spindle 72 extends through the aperture 70 and carries a manually-operable handle 76 at its upper end.

A circular flexible diaphragm 80 is located in the recess 22 and has an outer diameter which causes the radially-outer edge of the diaphragm to be a close fit with the radially outer wall 27 of the recess 22. The diaphragm 80 has a thickness equal to the depth of the radially outer portion 26 of the recess 22. The diaphragm 80 sits in the recess 22 with its radially outer portion in engagement with the bottom surface 54 of the radially outer portion 24 of recess 22.

The diaphragm 80 has a deformable lower sealing layer 82 of a suitable sealing material such as Teflon (trademark) and a resiliently deformable upper backing layer 84 of suitable rubber such as EPDM bonded thereto. As can be best seen in FIG. 2, the end face 32 of the tubular outer member 30 is located slightly below the level of the bottom surface 54 of passage 22. Thus, in the undeflected condition of the diaphragm 80 as shown in FIG. 2, the outlet 36 in outlet member 30 is in communication with the annular inlet chamber 28 because there is a small gap between the end face 32 of the outlet member 30 and the diaphragm 80.

The central aperture in flange 64 and the internal chamber 68 in the tubular upper portion 60 of the clamping member 14 contain a spring 90 with a circular bearing member 92 at its upper end engaging the lower end of spindle 72 and a circular bearing member 94 at its lower end engaging the central portion of diaphragm 80.

Normally, when the back pressure valve is used in a fluid pressure system, the spindle 72 will have been screwed down by means of a handle 76 to cause the spring 90 to engage the diaphragm 80 with a predetermined force deflecting the diaphragm 80 into engagement with the concentric annular ridges 34 on the end face 32 of the outlet member 30 in a valve closing manner. Thus, the valve is closed unless the fluid pressure on the inlet side rises above a predetermined value, i.e. when the pressure in the annular inlet chamber 28 is sufficient to move the diaphragm 80 off the end face 32 of the outlet member 30 against the force exerted by spring 90.

If it is desired to bleed air from the system, the spindle 92 can be raised by operation of the handle 76 until the spring 90 no longer exerts a force on the diaphragm 80. The diaphragm then returns to its undeflected condition shown in FIG. 2 in which the diaphragm 80 is spaced from the end face 32 of the outlet member 30 so that air can pass therebetween. Air can therefore travel from the inlet 48 through the outlet member 30 to the outlet 40 or vice-versa.

In a specific embodiment of the invention, the diaphragm 80 had a diameter of 2.375 inches, the sealing layer 82 had a thickness of 0.005 inches, the backing layer 84 had a thickness of 0.125 inches, and a distance between the end face 32 of the outlet member 30 and the level of the bottom surface 54 of the radially outer portion 24 of the recess 22 was 0.02 inches.

FIG. 4 shows a pressure relief valve which in many respects is similar to the back pressure valve shown in FIGS. 1 to 3 and like reference numerals are used to indicate like parts. In the pressure relief valve of FIG. 4 however, the passage 38 from the tubular outlet member 30 passes to a drain port 96 in the bottom of the valve body 10, and the annular bottom surface 42 of the annular inlet chamber 28 has an outlet aperture 98 on the opposite side of the tubular outlet member 30 to the inlet aperture 44. The outlet aperture 98 communicates through a passage 100 in the valve body 10 with the outlet port 40.

In normal use as a pressure relief valve, the diaphragm 80 is held against the tubular outlet member 30 by the spring 90, and fluid can flow through the inlet 48, through the aperture 44 into the annular inlet chamber 28 and out therefrom through the aperture 98 to the outlet 40. If the fluid pressure in the annular inlet chamber 28 exceeds the predetermined value set by the spring 90, diaphragm 80 is forced upwardly by the fluid pressure overcoming the force exerted by the spring 90, so that the diaphragm 80 moves away from the end face 32 of the tubular outlet member 30 to enable fluid to drain through the outlet 36 in the tubular outlet member 30 to the drain port 96.

Other embodiments of the invention will be readily apparent to a person skilled in the art, the scope of the invention being defined in the appended claims.

I claim:

1. A pressure relief or back pressure valve including:
   a valve body having a tubular outlet member with an outlet surrounded by an end face, and an annular inlet chamber surrounding said outlet member,
   said end face of the tubular outlet member having a series of concentric annular ridges surrounding the outlet therein,
   said annular inlet chamber having an outer periphery defined by a wall member with an end face,
   a flexible diaphragm having an outer peripheral edge portion clamped between the end face of the wall member and a clamping member, and
   a resilient force applying device for applying a predetermined force to the diaphragm to cause the diaphragm to engage the concentric annular ridges on the end face of the outlet member in a valve closing manner.

2. A pressure relief or back pressure valve according to claim 1 wherein the diaphragm has an end face engaging layer of sealing material and a backing layer of resilient material laminated thereto.

3. A pressure relief or back pressure valve according to claim 2 wherein the thickness of the sealing layer is in the range of from about 0.005 to about 0.02 inches, and the thickness of the backing layer is in the range of from about 0.625 to about 0.25 inches.

4. A back pressure valve according to claim 1 wherein, when the diaphragm is in engagement with the end face of the outlet member, said annular inlet chamber is in communication only with a valve inlet.

5. A pressure relief valve according to claim 1 wherein, when the diaphragm is in engagement with the end face of the outlet member, said annular inlet chamber is in communication with a valve inlet and a valve outlet separate from the tubular outlet member.

* * * * *